(12) United States Patent
Heyne et al.

(10) Patent No.: US 10,449,508 B2
(45) Date of Patent: *Oct. 22, 2019

(54) METHOD FOR THE INFRARED-LIGHT-INDUCED YIELD OPTIMIZATION OF CHEMICAL REACTIONS BY MEANS OF VIBRATION EXCITATION

(71) Applicant: FREIE UNIVERSITÄT BERLIN, Berlin (DE)

(72) Inventors: Karsten Heyne, Beelitz (DE); Florian Kössl, Berlin (DE); Valeri Kozich, Berlin (DE)

(73) Assignee: FREIE UNIVERSITAET BERLIN, Berlin (DE)

( * ) Notice: Subject to any disclaimer, the term of this patent is extended or adjusted under 35 U.S.C. 154(b) by 702 days.

This patent is subject to a terminal disclaimer.

(21) Appl. No.: 14/780,499

(22) PCT Filed: Mar. 27, 2014

(86) PCT No.: PCT/EP2014/056220
§ 371 (c)(1),
(2) Date: Sep. 25, 2015

(87) PCT Pub. No.: WO2014/154834
PCT Pub. Date: Oct. 2, 2014

(65) Prior Publication Data
US 2016/0051963 A1   Feb. 25, 2016

(30) Foreign Application Priority Data

Mar. 27, 2013 (DE) .................. 10 2013 205 462

(51) Int. Cl.
B01J 19/12        (2006.01)

(52) U.S. Cl.
CPC ........... *B01J 19/128* (2013.01); *B01J 19/121* (2013.01); *B01J 2219/1203* (2013.01)

(58) Field of Classification Search
CPC . B01J 19/128; B01J 19/121; B01J 2219/1203
(Continued)

(56) References Cited

U.S. PATENT DOCUMENTS 4,124,466 A    11/1978  Morrey
4,313,807 A *  2/1982  de Mevergnies ...... B01D 59/34
                                                      204/157.2

(Continued)

FOREIGN PATENT DOCUMENTS

DE          19547641 A1    6/1997
DE    10 2011 050 894 A1  12/2012
(Continued)

OTHER PUBLICATIONS

Snels M. et al: "IR dissociation of dimers of high symmetry molecules: SF6, SiF4 and SiH4", Chemical Physics, North-Holland, NL, vol. 109, No. 1, Nov. 1, 1986, pp. 67-83.
(Continued)

*Primary Examiner* — Nicholas A Smith
*Assistant Examiner* — Colleen M Raphael
(74) *Attorney, Agent, or Firm* — Maschoff Brennan

(57) ABSTRACT

The invention relates to a method for the infrared-light-induced yield optimization of chemical reactions, wherein an energy input into at least one starting material that is subjected to a chemical reaction takes place by means of infrared light pulses having a mean wavelength in the range of 2000 to 100000 nm. The chemical reaction here is a reaction in which a product, the molecular formula of which does not correspond to the molecular formula of the starting material, is formed and wherein the yield optimization for the most part is not based on a thermal heating of the starting (Continued)

material. The invention is characterized in that the infrared light pulses have a fixed wavelength and in that the energy input into the starting material takes place by means of vibration excitation by a one-photon process.

16 Claims, 2 Drawing Sheets

(58) Field of Classification Search
USPC ............. 204/157.15, 157.22, 157.41, 157.61
See application file for complete search history.

(56) References Cited

U.S. PATENT DOCUMENTS

| | | | | |
|---|---|---|---|---|
| 4,417,964 | A * | 11/1983 | Wolfrum | B01J 19/121 204/157.61 |
| 4,447,303 | A * | 5/1984 | Jensen | B01D 59/34 204/157.2 |
| 5,666,639 | A * | 9/1997 | Eerkens | B01D 59/18 204/157.22 |
| 5,883,350 | A * | 3/1999 | Eerkens | B01D 59/18 204/157.22 |
| 8,337,673 | B2 * | 12/2012 | Herlin-Boime | B01J 19/121 204/157.41 |
| 9,617,368 | B2 * | 4/2017 | Heyne | B01J 19/121 |
| 2007/0272541 | A1 * | 11/2007 | Kitada | B01J 19/128 204/157.43 |
| 2008/0177359 | A1 * | 7/2008 | Pierce | A23L 3/26 204/158.2 |
| 2008/0217159 | A1 * | 9/2008 | Takeda | C12Q 1/6813 204/155 |

FOREIGN PATENT DOCUMENTS

| | | |
|---|---|---|
| EP | 0 658 373 A1 | 6/1995 |
| WO | 2006/069448 A2 | 7/2006 |
| WO | 2007/082861 A1 | 7/2007 |

OTHER PUBLICATIONS

Kuze H. et al: "Isotope-selective photodissociation of ozone molecules induced by infrared laser irradiation", Chemical Physics Letters, Elsevier BV, NL, vol. 455, No. 4-6, Apr. 10, 2008 (Apr. 10, 2008), pp. 156-158.
Catalano E et al: "Infrared Laser Single Photon Absorption Reaction Chemistry in the Solid State. Reactions of Nitrogen Oxides with Sulfur Hexafluoride", Journal of Physical Chemistry, vol. 84, No. 13, Jun. 1980 (Jun. 1980), pp. 1686-1694.
C.J. Hawker, "New polymer synthesis by nitroxide mediated living radical polymerizations." Chem. Rev. Dec. 2001, 101 (12), pp. 3661-3688.
R. Bonnett, "Photosensitizers of the porphyrin and phthalocyanine series for photodynamic therapy." Chemical Society Reviews, 1995, vol. 24(1), pp. 19-33.
A. Zewail, "Femtochemistry: Atomic-Scale Dynamics of the Chemical Bondt," J. Phys. Chem. A, Apr. 18, 2000, 104 (24), pp. 5660-5694.
R.N. Zare, Science 1998, 279, pp. 1875-1879; "Analysis and Control of Ultrafast Photoinduced Reactions", Springer Series in Chemical Physics 87, 2007.

T. Witte et al. "Controlling molecular ground-state dissociation by optimal vibrational ladder climbing" J. Chem. 15 Phys. (Feb. 2003), 118, pp. 2021-2024.
D. Zeidler et al. "Optimal Control of Ground-State Dynamics in Polymers", (J. Chem. Phys. (Mar. 2002), 116, pp. 5231-5235.
N.C. Strandwitz et al., "One- and Two-Photon Induced Polymerization of Methylmethacrylate Using Colloidal CdS Semiconductor Quantum Dots" J. Am. Chem. Soc, Jun. 2008, 130, pp. 8280-8288.
B.H. Bransden & C.J.Joachain "Physics of Atoms and 20 Molecules" (2nd Edition) Addison-Wesley; 2 edition (Jun. 23, 2003).
Kozich et al. "Vibrational excitation after ultrafast Intramolecular proton transfer of TINUVIN: A time-resolved resonance Raman study," Chem. Phys. Lett. (Dec. 2004), 399, 484-489.
P.W. Atkins, "Physical Chemistry," 5th edn., Oxford University Press, Oxford, 1994.
K. Heyne et al. "Cascaded Energy Redistribution upon O—H Stretching Excitation in an Intramolecular Hydrogen bond" J. Phys. Chem. A Jul. 2004, 108, 6083.
V. Kozich et al. "Time-resolved resonance Raman scattering of the excited singlet state of 2-(2'-hydroxyphenyl) benzoxazole after excited state intramolecular proton transfer" Chem. Phys. Lett., (2005), 415, 121-125.
Kozich et al. "Ultrafast redistribution of vibrational energy after excitation of NH stretching modes in DNA oligomers" Chem. Phys. Lett. (Apr. 2009), 473, 171-175.
Haaken, Wolf, "Molekülphysik and Quantenchemie" (Molecular physics and quantum chemistry; Introduction to Experiments and Theory) 2nd edition, Apr. 18, 2013.
Kozich et al. "Ultrafast excitation of out-of-plane vibrations and vibrational energy redistribution after internal conversion of 4-nitroaniline" J. Chem. Phys. (2003), 118, 1808-1814.
Catalano et al., Infrared laser single photon absorption reaction chemistry in the solid state. I. The system SiH4-UF6 Journal of Chemical Physics 70, 3291 (1979).
Li, W. et al., A Reaction Accelerator: Mid-infrared Strong Field Dissociation Yields Mode-Selective Chemistry, J. Phys. Chem. Lett. 2012, 3 2541-2547.
Demtröder, W. Laser Spectroscopy: Basic Concepts and Instrumentation, Springer Science & Business Media, 2003 (Abstract Only).
Kühn et al., Analysis and Control of Ultrafast Photoinduced Reactions. Springer Series in Chemical Physics 87, Springer-Verlag, 2007 (Abstract only).
Butenhoff et al., "The near-infrared photochemistry ofporphine imbedded in an N-hexane matrix," Spectrochimica Acta Part A: Molecular Spectroscopy, vol. 46, Issue 4, 1990, pp. 519-522.
Kozich et al, "High energy femtosecond OPA pumped by 1030 nm Yb:KGW laser," Optics Communications, vol. 285, Issue 21-22, Oct. 1, 2012, pp. 4515-4518.
Lin et al., "Laser-induced porous graphene films from commercial polymers," Nature Communications, vol. 5, Article No. 5714, Dec. 10, 2014, pp. 1-8.
Tesch et al., "Design of optimal infrared femtosecond laser pulses for the overtone excitation in acetylene," Chemical Physics, vol. 267, Issues 1-3, Jun. 1, 2001, pp. 173-185.
Windhorn, L., "Molekulare Dissoziation im elektronischen Grundzustand induziert durch Femtosekundenpulse im mittleren Infrarot," Dissertation, LMU München: Faculty of Physics, Jul. 25, 2003, pp. 1-112.
Case, Andrew, Gaining Control, Solution-Phase Reaction Dynamics, Nature Chemistry, vol. 10, Feb. 2018, pp. 113-114.
Stensitzki, Till, Acceleration of a ground-state reaction by selective femtosecond-infrared-laser-pulse excitation, Nature Chemistry, Jan. 1, 2018, pp. 1-6.

* cited by examiner

METHOD FOR THE INFRARED-LIGHT-INDUCED YIELD OPTIMIZATION OF CHEMICAL REACTIONS BY MEANS OF VIBRATION EXCITATION

CROSS-REFERENCE TO A RELATED APPLICATION

This application is a National Phase Patent Application of International Patent Application Number PCT/EP2014/056220, filed on Mar. 27, 2014, which claims priority of German Patent Application Number 10 2013 205 462.9, filed on Mar. 27, 2013.

BACKGROUND

The invention relates to a method for the infrared-light-induced yield optimization of chemical reactions, particularly synthesis reactions as well as the use of infrared light pulses.

From WO 2006/069448 A2 a method for removing material by means of infrared light laser pulses is known, in which the energy of the infrared light is converted into heat energy of the material to be removed. Within the material to be removed hot spots are produced here, in which the temperature lies above the vaporization point of at least one component of the material to be removed.

From WO 2007/082861 A1 a method for synthesizing product molecules is known, in which energy is introduced by laser pulses of visible light into molecules of the starting material that are to react, wherein the reaction of the starting material molecules into product molecules takes place on a surface on which the molecules of the starting material are at least partly absorbed. When introducing visible light, an electronic excitation is induced.

From DE 10 2011 050 894 A1 a method for polymerizing monomer units and/or oligomer units by infrared light pulses is known, in which particularly chirped infrared light pulses are used to allow for higher vibration excitations. Here, excitations of multiple coherent vibration quanta of a vibration mode occur simultaneously in a molecule. This method is based on multi-photon processes.

It is known, for instance from C. J. Hawker, Chem. Rev. 2001, pages 3661-3688, that by electronic excitation with wavelengths shorter than 2000 nm, particularly 1000 nm, in some organic molecules radicals are produced, which can induce chemical reactions.

Furthermore, it is known, for instance from R. Bonnett, Chemical Society Reviews, 1995, 24(1), pages 19-33, that by electronic excitation in the wavelength range shorter than approximately 1200 nm, some organic molecules, particularly of the classes of molecules of the porphyrins, pthalocyanines, corroles, chlorines, pheophorbides and the tetrapyrroles, produce reactive singlet oxygen by triplet annihilation, which said reactive singlet oxygen induces chemical reactions.

It is equally known, for instance from A. Zewail, J. Phys. Chem. A 2000, 104, pages 5660-5694; R. N. Zare, Science 1998, 279, pages 1875-1879; "Analysis and Control of Ultrafast Photoinduced Reactions", Springer Series in Chemical Physics 87, 2007, editors: Oliver Kuhn and Ludger Wöste, that by electronic excitation with coherent light pulses which produce a quantum interference of vibration modes, chemical reactions, particularly dissociation reactions, can be controlled in the electronically excited state. This controlling of chemical reactions was also object of the Research Program 450 "Analysis and Control of light-induced chemical reactions" (SfB450).

In contrast to this, there are only few examples for chemical ladder climbing dissociation reactions by vibration excitation by means of infrared light pulses (T. Witte et al. J. Chem. Phys. (2003), 118, pages 2021-2024). Herein, the excitation of multiple coherent vibration quanta of a vibration mode in the electronic ground state occurs simultaneously in a molecule. For this, the absorption of multiple photons by the individual molecule is necessary.

D. Zeidler et al. (J. Chem. Phys. (2002), 116, pages 5231-5235) have introduced an experiment for the optimal control of the ground state dynamics. Here, a stimulated Raman process is optimized with visible light via a computer-controlled feedback loop in such a way that the coherent Raman active ground state vibrations can be manipulated in their phase. Thereby, in a time range of approximately one picosecond (ps), coherent wave packets can be produced, the relative phase of which to each other can be changed. This is only possible as long as the dephasing time lying between 0.1 ps and approximately 1.5 ps, is not over yet.

In the publication of N. C. Strandwitz et al., J. Am. Chem. Soc, 2008, 130, pages 8280-8288, a method was specified, in which the efficiency of the photo-polymerization—initiated by electronic excitation—is increased by approximately 5% due to the presence of a co-initiator. In said work, one- and two-photon absorption processes were used to electronically excite CdS semiconductor quantum dots and to produce radicals.

There have also been reports on the theoretical possibility of exciting coherent Raman active ground state vibrations by coherent excitation with light pulses in the visible spectral range, which can open a chemical reaction path.

Up to this day, no method has been specified and no research is known in which a reaction coordinate is directly or indirectly excited or activated by one-photon vibration excitation and thus a chemical reaction or chemical synthesis is deliberately controlled and/or accelerated.

SUMMARY

An object underlying the present invention is to specify a method for the light-induced yield optimization in specific chemical reactions that is simplified compared to the methods known from prior art.

This object is achieved by a method for the infrared-light-induced yield optimization of chemical reactions with the features as described herein. In such a method, an energy input into at least one starting material that is subjected to a chemical reaction takes place by means of infrared light pulses. The infrared light pulses have a mean wavelength in the range from 2000 to 100000 nm, particularly 3000 to 80000 nm, particularly 5000 to 50000 nm, particularly 10000 to 40000 nm and very particularly 20000 to 30000 nm.

The chemical reaction is a reaction in which a product is formed, the molecular formula of which does not correspond to the molecular formula of the starting material. That is to say, restructuring reactions such as, for instance, isomerization reactions or tautomerization reactions, in which the molecule structure but not the molecular mass of the considered substance changes, do not fall under the term "chemical reaction" in the sense used here.

For the most part (namely more than 50%, particularly more than 60%, particularly more than 70%, particularly more than 80%, particularly more than 90%, particularly more than 95%, particularly more than 98% and very particularly more than 99%), the yield optimization is not based on a thermal heating of the starting material.

The infrared-light-induced excitation only leads to a minor heating of the starting materials in the thermal equilibrium (a few degrees Celsius). According to Boltzmann statistics and Arrhenius Law, this heating is not sufficient to explain the increased reaction yield by preferably more than at least 10%. In the thermal equilibrium, the total energy of the individual molecule according to the Boltzmann statistics is divided onto its 3N-6 (or 3N-5 for linear molecules) vibrational degrees of freedom. If a molecule with N=30 atoms absorbs 2600 cm$^{-1}$ energy of a photon, the energy is thus distributed onto 84 vibrational degrees of freedom. Thus, on average, the energy of each individual vibration mode increases by approximately 31 cm$^{-1}$, which corresponds to less than approximately 10% of the kinetic energy at room temperature. This corresponds to only a minimal rise in temperature by approximately 3 kelvin.

The method is characterized in that the infrared light pulses have a fixed wavelength and the energy input into the starting material takes place by means of vibration excitation by a one-photon process.

In other words, the claimed method is based on the infrared-light-induced vibration excitation of a direct or indirect reaction coordinate in the electronic ground state of the chemical reaction, whereby temporarily in a non-equilibrium dynamic the activated state of the starting material or of the starting materials (also referred to as activated complex) is reached, and the probability of the chemical reaction is considerably increased. Without the infrared-light-induced vibration excitation the probability that the activated complex is formed—on account of the thermal energy distribution—is considerably smaller.

Before further details and embodiments of the claimed method are addressed, a few definitions shall follow for a better understanding of the claimed method and of the prior art cited above.

Definition 1: Infrared light pulses are light pulses in the wavelength range of 2000 nm to 100000 nm (cf. for instance B. H. Bransden & C. J. Joachain "Physics of Atoms and Molecules", Haaken, Wolf, "Molekulphysik und Quantenchemie" (Molecular physics and quantum chemistry) $2^{nd}$ edition). The light pulse is in some cases characterized by an individual photon.

Definition 2: An electronic excitation is an excitation by means of light pulses, which changes the occupation state of the electronic wave functions. Electronic excitations almost always lie in the wavelength range shorter than 1500 nm (cf. for instance B. H. Bransden & C. J. Joachain "Physics of Atoms and Molecules", Haaken, Wolf, "Molekülphysik und Quantenchemie" (Molecular Physics and Quantum Chemistry) $2^{11d}$ edition, Demtroder "Laserspektroskopie" (Laser Spectroscopy), $4^{th}$ edition).

Definition 3: A vibration excitation is an excitation in which a light pulse or a photon excites an infrared-active vibration in the infrared spectral range and consequently increases the occupation number of the vibration quantum of the molecule (cf. for instance, B. H. Bransden & C. J. Joachain "Physics of Atoms and Molecules", Haaken, Wolf, "Molekülphysik and Quantenchemie" (Molecular Physics and Quantum Chemistry) $2^{nd}$ edition).

Definition 4: Dissociation reactions are reactions in which the product has a smaller molar mass after the reaction than the starting material prior to the reaction.

Definition 5: Ladder climbing dissociation reactions are dissociation reactions which are induced by the fact that a fast sequential absorption of multiple coherent photons takes place, which causes the higher vibration-excited bond to be transferred into the anti-binding state and thus to break. Very high intensities are necessary for this. This process does not correspond to any chemical reaction taking place otherwise.

Definition 6: A synthesis reaction is a reaction of at least one starting material, however, mostly between more than one starting material, in which a new molecule (product) is produced, the molar mass of which is greater than the mass of either of the starting materials. The product here contains molecular constituents of more than one starting material, if more than one starting material is employed.

Definition 7: A restructuring reaction is a reaction in which the molar mass of a molecule is not changed but the spatial arrangement of the atoms relative to each other in the molecule is different (e.g. $CH_3NC \square CH_3CN$).

Definition 8: Non-equilibrium dynamics is the dynamics of a molecule at that point in time in which the vibrational states are not occupied according to the Boltzmann statistics. This is the case when a vibration mode is excited and the vibration energy of that vibration mode is not yet distributed onto all vibration modes of the molecule. The Boltzmann statistics applies when the molecules are in the thermal equilibrium or can be specified by a temperature. Chemical reactions which are driven by the temperature take place in the thermal equilibrium. The same rule also applies to exothermic and endothermic reactions.

Definition 9: One can only speak of the temperature of a molecule if all vibration modes according to the Boltzmann statistics are occupied.

Definition 10: After a vibration excitation and as long as the vibration modes are not distributed onto all vibration modes of the molecule according to the Boltzmann statistics, one can merely speak of a pseudo-temperature. The pseudo-temperature can be calculated from the ratio of the occupation numbers of anti-Stokes signals and Stokes signals (cf. Kozich et al. Chem. Phys. Lett. (2004), 399, 484-489; Kozich et al. J. Chem. Phys. (2003), 118, 1808-1814).

Definition 11. The reaction coordinate is the variable along which a change must be induced to get to the activated complex. In other words, the reaction coordinate is an abstract one-dimensional coordinate, which illustrates the progress along the reaction path. For reactions in the electronic ground state—that is, most chemical reactions—the reaction coordinate can be specified by a vibration or the combination of vibrations. When the activated complex is formed, the products can be formed or the chemical reaction can take place, respectively. For the formation of the activated complex, the activation energy must be supplied. By supplying the activation energy, the potential barrier for the reaction is overcome (cf. P. W. Atkins, Physical Chemistry $5^{th}$ edition, Oxford University Press).

The method claimed according to the invention differs from the methods known from prior art in that in the present method only precisely one vibration mode is excited, and that is by a one-photon process. Hitherto, it was proceeded on the assumption that such one-photon processes can only be employed for restructuring reactions such as, for instance, an isomerization or a tautomerization, as the energy that can be transferred onto a molecule by means of a one-photon process is comparably low. In DE 10 2011 050 894 A1 this fact has been explained explicitly (see paragraph [0020] of said German patent application). Surprisingly, however, it could now be ascertained that one-photon processes are also suited to cause a yield optimization in chemical reactions beyond the restructuring reactions.

Whether a chemical reaction takes place according to a one-photon process or a two-photon process or a multi-photon process can comparably easily be adjusted and verified. The crucial parameters herein are the concentration of the starting materials that are to be brought to react and the intensity of the light pulses used. When the concentration of the starting materials is high, the probability that a starting material absorbs precisely one photon, that is, that a one-photon process takes place, is also high. When, however, the concentration of the starting materials is low, the probability that two-photon processes or multi-photon processes take place, is considerably larger. For then a light pulse often only interacts with one molecule, so that more than one photon of the light pulse can transfer onto the respective molecule.

However, when the concentration of the starting material is high, a light pulse interacts with numerous molecules, so that the transfer of individual photons from the light pulse onto individual molecules of the starting material is much more probable.

Therefore, in order to perform a one-photon process, only comparably low intensities of the employed light pulse are necessary, wherein the preferably employed intensity depends on the selected concentration of the starting material and the kind of starting material molecules. Due to numerous different possible starting materials, therefore, no generally valid intensity range for the light pulses can be indicated. It is equally not possible to specify a generally valid concentration for the starting materials. Rather, a person skilled in the art can calculate the parameters starting material concentration and light pulse intensity as determining factors by means of a comparably simple calculation and set them in such a way that a one-photon process takes place. This is subsequently illustrated as an example.

Assuming there are N molecules in the sample volume exposed by the light pulse which absorb the light pulse with a probability of 99% (for instance at an optical density of 2 OD, that is, approximately 100%). The number of photons in the light pulse, however, is only $10^{-2}*N$, then only approximately every hundredth molecule is excited. The probability that a further photon meets a molecule that has already absorbed a light photon, consequently is 1 to 10000. Such a process, in which an excited molecule is excited again, would in technical terms be referred to as ladder climbing excitation or as sequential resonant excitation. These processes can only occur in the short time span of the excited state and are therefore attained only with ultra-short light pulses.

A two-photon excitation is typically less probable, at least by a factor of one hundred, than a one-photon excitation. In multi-photon processes the probability drops further. For these processes, there must be considerably more photons than absorbing molecules in the sample volume exposed by the light pulse. For example, there can be N molecules in the sample volume, which have no one-photon absorption at the wavelength of the light but a typical two-photon absorption at an optical density of 0.002 OD. That means that approximately 0.5% of the molecules absorb two photons, if these meet the molecule at the same time. Assuming the light pulse has a length of only 10 fs, then the simultaneity can be basically met well. Now, if the light pulse has 2N photons (200 times more than in the above example relating to the one-photon process), then only approximately 0.5% of the molecules are excited. Should the light pulse be longer than 100 fs, this number is even more drastically reduced. For this reason, two- and multi-photon processes have almost exclusively been attainable with ultra-short laser pulses and have been accessible only after introducing the laser.

The preconception known from prior art, that one-photon processes can only be employed for isomerization reactions and tautomerization reactions, can clearly be refuted by the present method. For with the present method it is possible to perform a yield optimization in chemical reactions which precisely do not represent restructuring reactions.

The selection of the desired vibration mode which is to be excited takes place by means of the wavelength of the infrared light pulses. As already explained, the infrared light pulses have an invariable wavelength, that is to say, precisely no chirp is applied to the infrared light pulses. Rather, such a chirp would be counterproductive, as it would not cause the excitation of an individual vibration mode but instead the excitation of various vibration modes.

The energy input into the starting material, imparted by the vibration excitation, can take place in a direct or indirect manner. This will yet be explained further below.

It is irrelevant to the present method for the infrared-light-induced yield optimization whether only starting materials of a single type or starting materials of two or various types are employed. Referring to a polymerization reaction as a special form of the chemical reaction, the yield can be optimized with the present method in the production of both a homopolymer and a heteropolymer or copolymers. For the sake of convenience, subsequently always one starting material will be referred to even though, actually, various starting materials can be employed.

In a variant the method is performed such that by the vibration excitation of the starting material the yield of a desired product is increased and/or the yield of an undesired product is lowered. In this manner it is ensured that a yield optimization takes place concerning the desired product. Moreover, when due to the infrared-light-induced yield optimization undesirable side reactions are avoided, the total efficiency of the reaction can rise. For then the amount of produced product per employed amount of starting material is increased.

In a further embodiment in a given time interval at least 10%, particularly at least 20%, particularly at least 30%, particularly at least 40%, particularly at least 50%, particularly at least 60%, particularly at least 70%, particularly at least 80%, particularly at least 90%, particularly at least 100%, particularly at least 150% and very particularly at least 200% more of the desired product are obtained by the yield optimization than in the case of a non-yield-optimized execution of the reaction. That means that the yield optimization is directed not only at the basic increase of the yield of the desired product but also at the yield of the desired product per time interval. In other words, with the specified method for the infrared-light-induced yield optimization an acceleration of the reaction can be attained.

If one considers not only the temporal component of the yield optimization, but instead both the temporal and the spatial component, in a variant the result is an even better yield optimization. For, as will be described below, the method preferably is suited for a spatially resolved yield optimization, which can be attained particularly by focusing the radiated infrared light pulses. In the context of such a spatially resolved yield optimization, the reaction can be carried out both faster and also spatially more confined than methods known from prior art. The result of this is a synergistic effect, which can, for instance, be made use of in the production of micro-structured polymers.

In a further variant the chemical reaction is a synthesis reaction. Hence, in this more narrow definition of the term "chemical reaction", dissociation reactions or ladder climbing dissociation reactions are excluded. In a further variant, the term "chemical reaction" comprises precisely no bimolecular reactions.

In a further alternative embodiment of the method the chemical reaction is a reaction in which the molar mass of the product deviates at least 20% particularly at least 30%, particularly at least 40%, particularly at least 50%, particularly at least 60%, particularly at least 70%, particularly at least 80%, particularly at least 90%, particularly at least 100%, particularly at least 150% and very particularly at least 200% from the molar mass of at least one starting material. In particular, the molar mass of the product is greater than the molar mass of the starting material (in this case a synthesis has taken place).

In an alternative embodiment of the method the chemical structure of the product differs from the chemical structure of the starting material in at least one atom, particularly at least two atoms, particularly at least three atoms, particularly at least four atoms, particularly at least five atoms, particularly at least six atoms, particularly at least seven atoms, particularly at least eight atoms, particularly at least nine atoms and very particularly at least 10 atoms. The atoms, regarding which there is a change between the product and the starting material, can in particular be protons. Moreover, any combination of these or other atoms is also possible.

In a further embodiment of the method the infrared light pulses are produced by a non-coherent light source. Such non-coherent light sources are, for instance, standard infrared light lamps or Globars. With such non-coherent light sources, the one-photon process can be carried out in an especially advantageous manner. A gas discharge lamp is also suitable as a non-coherent light source. A continuous irradiation with such light sources represents a series of light pulses that act upon the starting material.

In a further embodiment of the method the infrared light pulses are produced by a laser. Such coherent light sources can also be employed to induce the desired one-photon process. Both pulsed lasers and continuously emitting lasers (cw-laser) can be employed here. In the case of continuously emitting lasers (also referred to as continuous-wave laser) the infrared light pulses can be produced by a subsequently arranged shutter or a comparable element. A continuous irradiation of the starting materials is equally possible.

In a further alternative embodiment of the method the infrared light pulses have no phase modulation. This can, for instance, be accomplished by employing a light source which is not phase modulated. With such a light source it can, in turn, in an especially simple manner be prevented that coherent processes are excited, whereas the desired one-photon process is induced in an especially advantageous manner.

In a further alternative embodiment of the method the infrared light pulses have a spectral width of less than 50 $cm^{-1}$, particularly of less than 40 $cm^{-1}$, particularly of less than 30 $cm^{-1}$, particularly of less than 20 $cm^{-1}$, particularly of less than 10 $cm^{-1}$, particularly of less than 5 $cm^{-1}$, particularly of less than 2 $cm^{-1}$ and very particularly of less than 1 $cm^{-1}$. With such narrow-band infrared light pulses a selection of the vibration mode which is desired for vibration excitation can take place in an especially advantageous manner. The more narrow-band the infrared light pulses are, the less probable is an excitation of multiple vibration modes. However, it must be taken into account herein also that a certain spectral width is regularly required for the efficient excitation of an individual spectral mode.

In a further alternative method embodiment the infrared light pulses have a polarization. Preferably, the polarization is a linear polarization. In this manner, it is possible to excite only vibrations of molecules which are located in a specific spatial orientation in the reaction mixture. Hence, by means of infrared light pulses polarized in such a way, specific structures of the product can be produced in the reaction mixture, if one ensures that the diffusion of product molecules is reduced or almost entirely prevented.

In a further alternative method embodiment the light pulses further have a pulse duration of at least 100 fs and 10 ps maximum, particularly in the range of 200 fs to 5 ps, particularly in the range of 300 fs to 3 ps, particularly in the range of 500 fs to 2 ps, particularly in the range of 700 fs to1 ps.

As already briefly explained above, the energy input into the starting material can take place in a direct or indirect manner by means of vibration excitation. In a variant of the method the infrared light pulses first excite a catalyst by means of vibration excitation by a one-photon process. Thereafter, the catalyst relaxes and thereby gives off a part of the energy previously transferred onto it to the starting material. This is an indirect energy input into the starting material, wherein the energy input in this case also takes place by means of vibration excitation by a one-photon process.

In a further embodiment of the method the infrared light pulses are (without a "detour" via a catalyst or another third party molecule) absorbed by the starting material. In this manner a direct energy input into the starting material is possible. Whether the method is performed while making use of a direct or an indirect energy input significantly depends on the wavelength of the infrared light pulses. If the employed infrared light pulses have a wavelength that corresponds to the frequency of a vibration in the starting material molecule, a direct energy input takes place. However, if the selected wavelength corresponds to a frequency of a vibration of the catalyst, an indirect energy input takes place.

Finally, combinations of a direct and an indirect energy input are also possible. Thus, it is provided in a variant of the method that the vibration excitation of the starting material takes place indirectly by intermolecular and/or intramolecular vibration relaxation. For example, a first vibration in the starting material can be excited directly by the infrared light pulses and then transfer its energy onto a further vibration in the same starting material molecule or in another starting material molecule. In this manner, there would first be a direct energy input, which is then transformed into an indirect energy input of the ultimately excited vibration.

The intermolecular and/or intramolecular vibration relaxation does not only lead to an excitation of a further vibration or reaction coordinate, but instead also to a decrease of the share of another vibration or of another reaction coordinate, so that in this manner a deliberate vibration selection or a selection of a suitable reaction coordinate can take place. This phenomenon of the intermolecular and/or intramolecular vibration relaxation will subsequently be explained again in more detail.

Heyne et al. (*Cascaded Energy Redistribution upon O-H Stretching Excitation in an Intramolecular Hydrogen bond*: K. Heyne, E. T. J. Nibbering, T. Elsaesser, M. Petkovic and O. Kühn, *J. Phys. Chem. A* 2004, 108, 6083; V. Kozich et al. Chem. Phys. Lett., (2005), 415, 121-125; Kozich et al. Chem. Phys. Lett. (2009), 473, 171-175) have demonstrated that a direct excitation of an individual vibration mode such as, for instance, an O—H-stretching vibration can lead to the fact that the excitation can be distributed within only a few picoseconds onto other vibration modes (for instance onto O—H-bending vibrations). Consequently, by direct excitation of a vibration mode within a non-equilibrium dynamics other vibration modes can be excited indirectly. With this vibration relaxation, the various vibration modes are occupied as if they had been excited directly.

There is, therefore, an indirect excitation of the reaction coordinate when a vibration is excited and on a time scale, on which the thermal equilibrium according to the Boltzmann-statistics is not formed, other vibrations are excited as a result of a vibration energy redistribution, which form the reaction coordinate. Referring to the example mentioned above and specified in Heyne et al., the O—H-bending vibration could be the reaction coordinate, which is excited due to the fact that the excitation of the O—H stretching vibration relaxes in this vibration mode, considerably before the thermal equilibrium in the molecule sets in.

In a further alternative method embodiment a pseudo-temperature is temporarily reached in the starting material, which is higher by at least 30%, particularly by at least 40%, particularly by at least 50%, particularly by at least 60%, particularly by at least 70%, particularly by at least 80%, particularly by at least 90% and very particularly by at least 100% than the temperature in the starting material prior to the energy input by the infrared light pulses. The term "temporarily", here, is understood to be a time duration of less than 1 ns, particularly less than 750 ps, particularly less than 500 ps and very particularly less than 100 ps. As explained above, the pseudo-temperature of the molecule does not correspond to its temperature. Rather, the pseudo-temperature exists only for a short time period, during which an occupation of all the vibration modes of the molecule takes place according to the Boltzmann statistics. An increased pseudo-temperature therefore does not represent a thermally heated molecule, but instead merely serves as a measure for the energy input that took place, which is transferred into the corresponding vibration modes within a short time period.

In a further alternative method embodiment multiple superposed infrared light pulses are used, which differ from each other in each case in at least one parameter. The mean wavelength of the infrared light pulses is particularly used as difference parameter here. However, other parameters such as, for instance, the pulse duration or the pulse intensity can also be varied. In this manner, it is possible to produce multiple vibration excitations in the starting material simultaneously, wherein the individual vibration excitations are in each case performed by one-photon processes.

In an alternative embodiment of the method the product, the yield of which is optimized, is an antibiotic, a natural product or a medicine, wherein the chemical reaction is a thermally driven reaction. Independently of the actually obtained products, the method for infrared-light-induced yield optimization is suited particularly for yield optimization in chemical reactions which are thermally driven. By applying the method in the production of antibiotics, the natural product synthesis or the production of medicine, essential steps of the reaction are regularly thermally driven. It is therefore recommendable to employ the method for yield optimization in such production or synthesis processes.

In a further alternative method embodiment at least two molecules of the starting material (which, as explained above, can be the same or be different) are associated with each other by physical and/or chemical bonds during the vibration excitation. Such an association by means of bonds leads to a further efficiency increase of the yield-optimized chemical reaction, as the probability for the reaction of the starting materials is increased in this manner. The association can happen, for instance, by means of a hydrogen bond, a van der Waals bond, by means of $\pi$-$\pi$ interaction, by means of an ionic bond, by means of a ligand bond and/or by means of a salt bridge. Obviously, in each case more than one of the afore-mentioned bonds or interactions can occur between two molecules in any combination. The association already present leads to a change in the probability of the reaction, because these two molecules no longer have to meet randomly via diffusion.

In an alternative method embodiment the energy input, which is attained by means of the vibration excitation, serves to form an activated complex of at least two molecules of the starting material. From of this activated complex the product is then thereafter produced. The energy input imparted by the vibration excitation, thus, is made use of in order to provide the activation energy needed to form the activated complex.

In a further method variant the vibration excitation serves to accelerate the chemical reaction in comparison to a reaction without vibration excitation. Therefore, the infrared-light-induced energy input in this variant not only serves the global optimization of the yield of the desired product but also a yield optimization by means of reaction acceleration. Independently of whether the yield of a desired product is now increased or the yield of an undesired product is lowered, such a reaction acceleration already increases the efficiency of the chemical reaction that is carried out.

In a further alternative method embodiment the light-induced yield optimization takes place in a localized volume of the starting material. This localized volume is determined by the spatial application of the infrared light pulses. Hence, by suitable focusing the yield optimization can be carried out with a high spatial resolution, which is why the method is suited, for instance, for producing micro-structured polymers. In this variant it is equally possible that a highly spatially resolved chemical synthesis or another chemical reaction is carried out.

The invention also relates to the use of infrared light pulses having a mean wavelength in the range from 2000 to 100000 nanometers for the vibration excitation of a starting material by a one-photon process. The infrared light pulses here have a fixed wavelength. Moreover, the chemical reaction is a reaction in which a product, the molecular formula of which does not correspond to the molecular formula of the starting material, is formed. Finally, the vibration excitation for the most part does not result in a thermal heating of the starting material.

Preferred embodiments of the above-explained method can in an analogous manner be applied to the disclosed use of infrared light pulses and vice versa.

BRIEF DESCRIPTION OF THE DRAWINGS

Further details of the method claimed are explained in connection with the figures.

DETAILED DESCRIPTION

Figure 1:
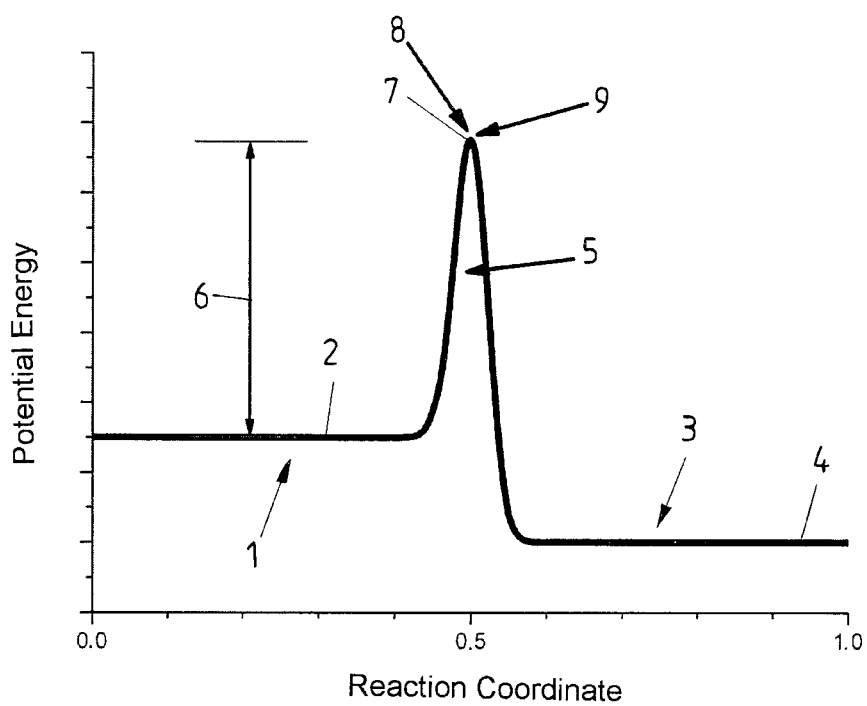
FIG. 1 shows a schematic illustration of a first one-dimensional potential energy landscape along the reaction coordinate.

FIG. 1 shows a schematic illustration of the energy landscape of a chemical reaction, wherein the potential energy is plotted against the reaction coordinate. The reaction coordinate expands along the reaction process over time, wherein the reaction begins at 0 and is over at 1.

First, there are starting materials 1, the potential energy of which lies on a first energy level 2. For the starting materials 1 to be able to be converted into products 3, the potential energy of which lies on a second energy level 4 that is lower than the first energy level 2, a potential barrier 5 for the chemical reaction must be overcome. To overcome this potential barrier 5, an activation energy 6 must be applied, the height of which corresponds to the difference between the first energy level 2 and a third energy level 7 which lies at the maximum of the potential barrier 5. When the activation energy 6 is applied to the starting materials 1, there is an activated complex 8, which corresponds to a transition state 9. From this activated complex 8 or transition state 9 the previous starting materials 1 can then be converted into the products 3.

The chemical reaction corresponding to the schematic process illustrated in FIG. 1 is a thermally driven reaction, which runs along the reaction coordinate from left to right and in which energy is released, the height of which results from the difference between the second energy level 4 and the first energy level 2.

For a reaction to be able to take place, it must be possible to form the transition state 9 or the activated complex 8. In order to increase the probability for the formation of the activated complex 8, catalysts are often employed to reduce the potential barrier 5 for the reaction. Thus, less activation energy 6 is needed, and a significant rise of the reaction yield (product yield) can be attained even at room temperature.

Figure 2:
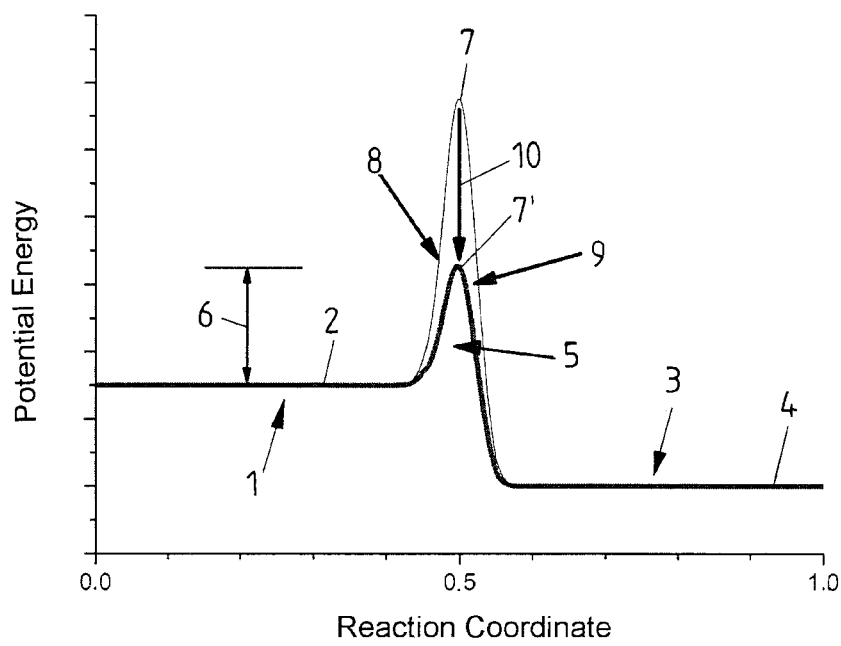
FIG. 2 shows a schematic illustration of a second one-dimensional potential energy landscape along the reaction coordinate when employing a catalyst.

In FIG. 2 a one-dimensional potential energy landscape is illustrated, which is similar to the energy landscape illustrated in FIG. 1. The same reference signs are yet again assigned to the same elements. The energy landscape illustrated in FIG. 2, however, relates to a reaction in which a catalyst is employed. The catalyst causes a decrease 10 of the potential barrier 5 to a lower level. Consequently, the maximum of the potential barrier 5 is no longer on the third energy level 7 but instead on a decreased third energy level 7'. Consequently, the activation energy to be applied to transfer the starting materials 1 to the activated complex 8 is considerably lower also. Hence, the probability of the reaction of the starting materials 1 into the products 3 is greater, because the potential barrier 5 can be overcome more easily. Moreover, with an additional energy input into the starting materials 1, overcoming the potential barrier 5 can become even more probable.

Such an energy input is often accomplished by a heating of the starting materials. In temperature jump reactions, for instance, the temperature is abruptly made to rise locally by means of an outside source in order to change the thermal occupation. Such processes are considerably slower than the processes of the present invention. In a temperature jump process a change in temperature is introduced locally. However, the molecules in the localized area in which the temperature is increased can be specified by the Boltzmann statistics. In this sense, such processes are molecular equilibrium processes.

If a solution is irradiated in a spatially localized manner with a nanosecond infrared laser, for instance, then the temperature of all the molecules changes significantly (including the solvent molecules). Therefore, the temperature changes are big. The rate constants for the thermal equilibrium change and all vibrations are excited in equal measure. The result of this are also time constants for this process which are longer by orders of magnitude in comparison to the infrared-light-induced yield optimization.

In this context, the inventors were able to demonstrate that a specific excitation of solvent molecules, leading to a heating of the solvent, does not result in the presently specified and claimed yield optimization. Rather, in the case of a heating of the solvent by means of infrared radiation excitation, no reaction acceleration relevant in the time scale considered here could be observed and, consequently, no yield optimization either.

Figure 3:
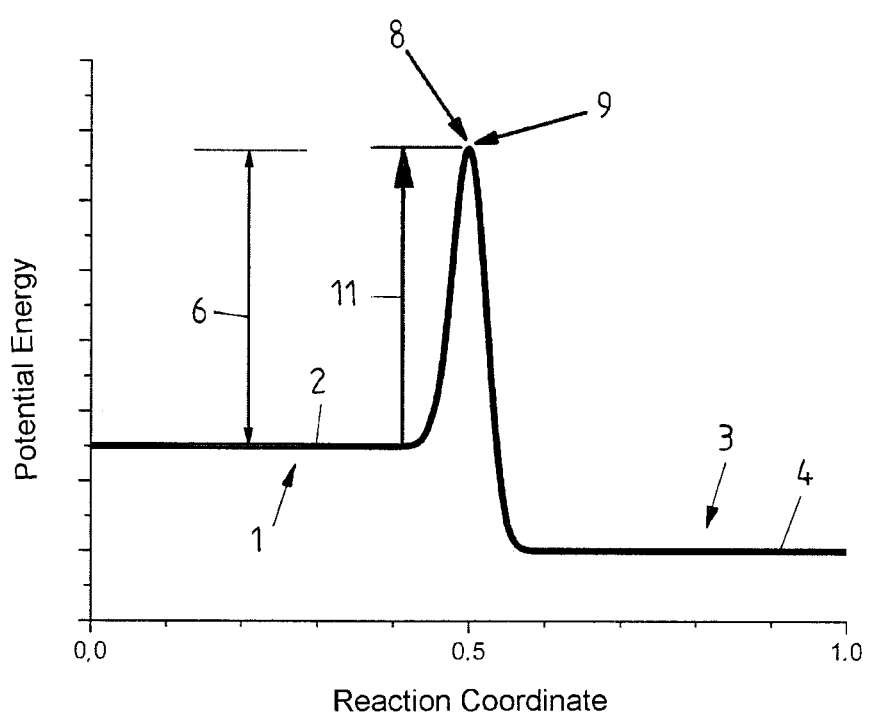
FIG. 3 shows a schematic illustration of a third one-dimensional potential energy landscape along the reaction coordinate when there is a light excitation.

FIG. 3 shows a further schematic illustration of a potential energy landscape, wherein yet again the same reference signs are assigned to elements already illustrated in FIGS. 1 and 2. In this regard, reference is made to the comments above.

In FIG. 3 a possibility of how overcoming the potential barrier 5 can be attained by an infrared-light-induced yield optimization is illustrated. For when an energy 11, provided by the infrared light pulses, corresponds at least to the activation energy 6, the starting materials 1 are transferred into the activated complex 8 or transition state 9. From there, the activated complex can react directly to the products 3 without further energy supply from outside. The absorption of infrared light temporarily causes a state of non-equilibrium in the starting materials 1. Before this state of non-equilibrium relaxes again to its original state, the activated complex can be transferred into the product, so that the reaction yield for the product 3 increases along the reaction coordinate.

The presently specified infrared-light-induced yield optimization by means of vibration excitation will subsequently be explained in more detail with the help of an example.

If the reaction coordinate is determined by a vibration, for instance a S—H-stretching vibration, and the activation energy by the excitation of said vibration, this means that the S—H— stretching vibration must be excited in order to reach the activated state.

The S—H stretching vibration typically absorbs at 2600 cm$^{-1}$. At room temperature T=293.15 K (20° C.), the mean kinetic energy of the molecules is 3/2 $k_B$T=305 cm$^{-1}$. That means that according to the Boltzmann distribution the relative occupation probability of the S—H stretching vibration is determined by N: N=exp(-$E_{vib}$/$k_B$T)=exp(-2600/$k_B$T)=2,7*10$^{-6}$=0.0000027. The probability of finding a molecule in this vibration-excited state is very small.

If the temperature is increased by 10° C., then the kinetic energy increases to 315 cm$^{-1}$, and N to 0.0000042. The probability of the thermal excitation is still very small, which means that the reaction takes place very slowly. In case that alternative reactions can also take place, the low probability of the reaction leads to an altogether very poor reaction yield or to an inefficient reaction process, respectively.

With an infrared-light-induced yield optimization, however, the efficiency of the reaction can be significantly increased by means of a transfer of starting material molecules into a vibration-excited state. To excite the S—H stretching vibration infrared light pulses with a wave number of 2600 cm$^{-1}$ are used. Due to such an excitation, the occupation probability of the S—H stretching vibration significantly increases.

The invention claimed is:

1. A method for the infrared-light-induced yield optimization of chemical reactions, wherein:
    an energy input into at least one starting material, which is subjected to a chemical reaction, takes place by means of infrared light pulses having a mean wavelength ranging from 2000 to 100000 nm, the chemical reaction is a synthesis reaction in which a product, the molecular formula of which does not correspond to the molecular formula of the starting material and the molar mass of which is greater than the molar mass of the starting material, is formed; and wherein the yield optimization for the most part is not based on a thermal heating of the starting material, and the infrared light pulses have a pulse duration of at least 100 fs and 10 ps maximum and a fixed wavelength and the energy input into the starting material takes place by means of vibration excitation by a one-photon process.

2. The method according to claim 1, wherein by the vibration excitation of the starting material the yield of a desired product is increased and/or the yield of an undesired product is decreased.

3. The method according to claim 1, wherein in a given time interval at least 10% more of a desired product are obtained due to the yield optimization than in the case of a non-yield-optimized execution of the reaction.

4. The method according to claim 1, wherein the infrared light pulses are produced by a non-coherent light source.

5. The method according to claim 1, wherein infrared light pulses are produced by a laser.

6. The method according to claim 1, wherein the infrared light pulses have no phase modulation.

7. The method according to claim 1, wherein the infrared light pulses have a spectral width of less than 50 cm'.

8. The method according to claim 1, wherein the infrared light pulses first excite a catalyst by means of vibration excitation by a one-photon process, wherein the catalyst thereafter gives off at least a part of the energy transferred onto it to the starting material.

9. The method according to claim 1, wherein the infrared light pulses are absorbed by the starting material.

10. The method according to claim 1, wherein the vibration excitation of the starting material takes place indirectly by intermolecular and/or intramolecular vibration relaxation.

11. The method according to claim 1, wherein within a time period of up to a nanosecond after an energy absorption a pseudo-temperature is reached in the starting material, which is by at least 30% higher than the temperature in the starting material prior to the energy input by the infrared light pulses.

12. The method according to claim 1, wherein multiple superposed infrared light pulses are used, which differ from each other in each case in at least one parameter, particularly regarding their mean wavelength.

13. The method according to claim 1, wherein the product, the yield of which is optimized, is an antibiotic, a natural product or a medicine, wherein the chemical reaction is a thermally driven reaction.

14. The method according to claim 1, wherein during the vibration excitation at least two molecules of the starting material are associated with each other by physical and/or chemical bonds.

15. The method according to claim 1, wherein the vibration excitation leads to the formation of an activated complex of at least two molecules of the starting material, from which thereafter the product is produced.

16. The method according to claim 1, wherein the vibration excitation leads to an acceleration of the chemical reaction in comparison to a reaction without vibration excitation.

* * * * *